United States Patent
Lin et al.

(10) Patent No.: US 8,534,731 B2
(45) Date of Patent: Sep. 17, 2013

(54) GRASPING APPARATUS

(75) Inventors: Wan-Cheng Lin, New Taipei (TW); Zhong-Liang Jian, Shenzhen (CN); Zhong-Qun Li, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/402,085

(22) Filed: Feb. 22, 2012

(65) Prior Publication Data
US 2012/0319417 A1  Dec. 20, 2012

(51) Int. Cl.
*B25J 15/00* (2006.01)

(52) U.S. Cl.
USPC ......... 294/198; 294/87.1; 294/99.1; 294/902; 901/37

(58) Field of Classification Search
USPC ........ 294/198, 99.1, 902, 87.1, 86.4; 901/37; 269/275
See application file for complete search history.

(56) References Cited

U.S. PATENT DOCUMENTS

| | | | | |
|---|---|---|---|---|
| 1,807,360 | A * | 5/1931 | Wehr | 294/106 |
| 3,198,568 | A * | 8/1965 | Mindrum | 294/198 |
| 5,201,501 | A * | 4/1993 | Fassler | 269/32 |
| 6,779,253 | B2 * | 8/2004 | Kim | 29/740 |
| 8,191,947 | B2 * | 6/2012 | Jouan De Kervanoael | 294/106 |
| 2004/0207222 | A1 * | 10/2004 | Miyamoto | 294/88 |
| 2005/0218679 | A1 * | 10/2005 | Yokoyama et al. | 294/99.1 |
| 2012/0205929 | A1 * | 8/2012 | Sdahl et al. | 294/196 |

FOREIGN PATENT DOCUMENTS

JP    05170398 A  *  7/1993

* cited by examiner

*Primary Examiner* — Saul Rodriguez
*Assistant Examiner* — Gabriela Puig
(74) *Attorney, Agent, or Firm* — Altis Law Group, Inc.

(57) ABSTRACT

A grasping apparatus includes a robot and a grasping assembly. The grasping assembly is rotatably mounted to the robot and includes a cylinder, two grasping plates, two grasping blocks and two first resilient members. The cylinder is secured to the robot. The two grasping plates are rotatably attached to the cylinder. The cylinder is capable of driving the two grasping plates to rotate towards each other. Each grasping block is slidably attached to each grasping plate. Each first resilient member is secured between each grasping block and each of the two grasping plates. When the two grasping plates are rotated towards each other, the two grasping blocks are adapted to sandwich a product therebetween.

17 Claims, 5 Drawing Sheets

GRASPING APPARATUS

BACKGROUND

1. Technical Field

The present disclosure relates to grasping apparatuses, and particularly to a grasping apparatus for grasping products from a mold.

2. Description of Related Art

Grasping apparatus may be used to remove products from a mold. In this situation, a preferred type of grasping apparatus may be a suction type, which requires at least some surface areas of the products be flat and smooth to work reliably, which limits use of this type of grasper as not all products will have such surfaces. Therefore, there is room for improvement in the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
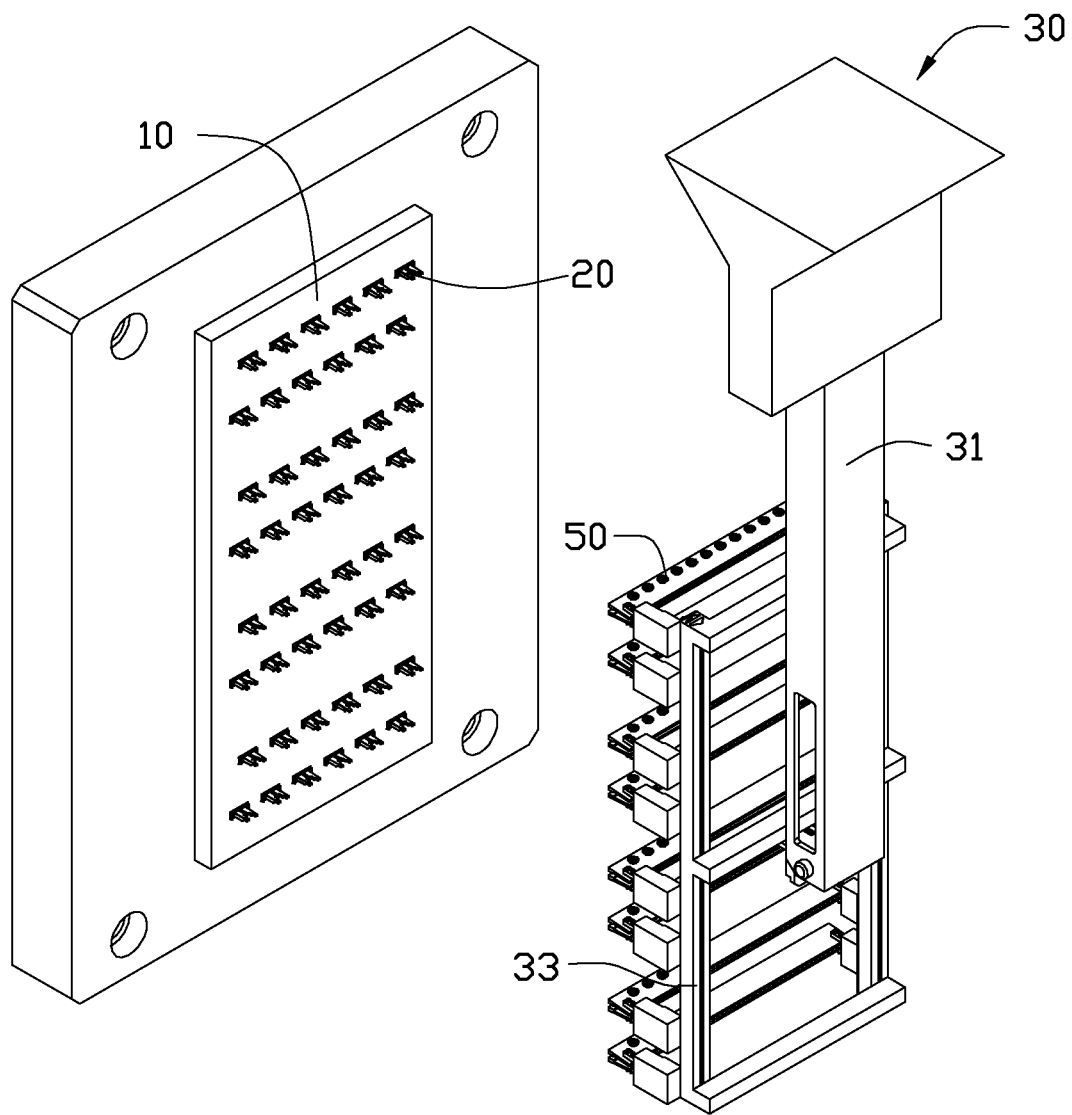
FIG. 1 is an exploded, isometric view of one embodiment of a grasping apparatus and a manufacturing device.

Referring to FIG. 1, a grasping apparatus is configured for grasping a plurality products 20 from a manufacturing device 10. The grasping apparatus in accordance with an embodiment includes a robot 30 and a plurality of grasping assemblies 50 secured to the robot 30.

The robot 30 includes a maintaining arm 31 and a rotating bracket 33. The rotating bracket 33 is adapted to secure the plurality of grasping assemblies 50.

Figure 2:
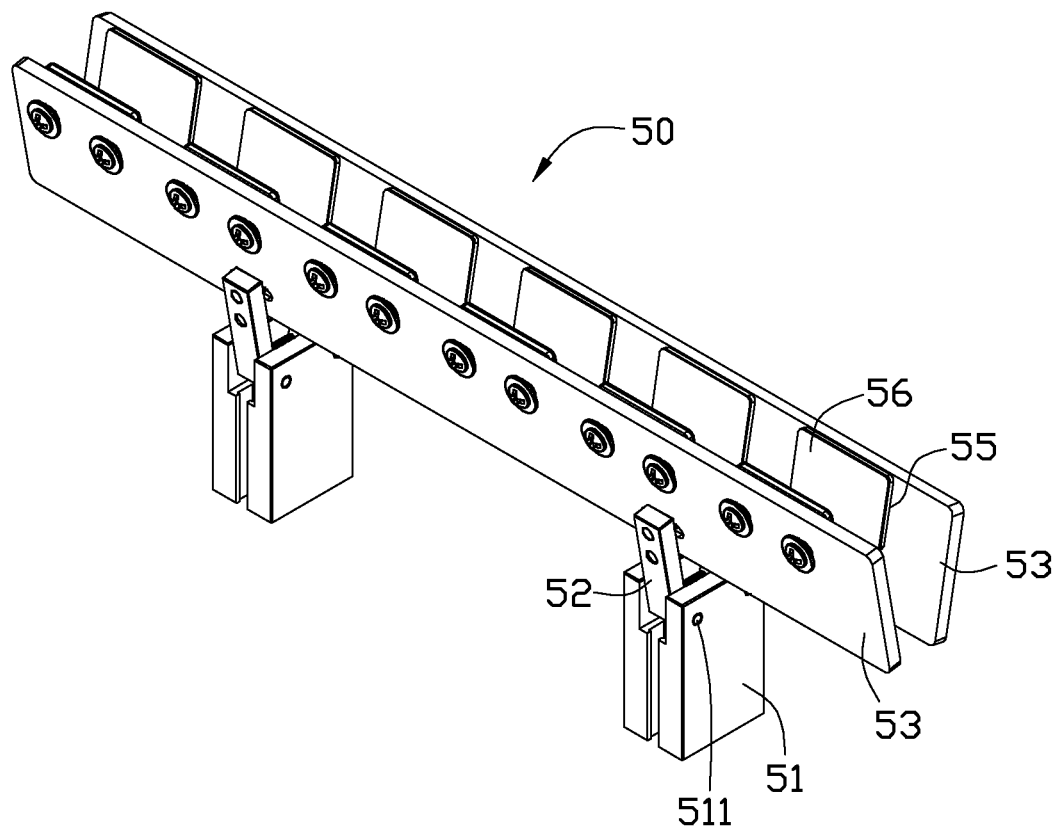
FIG. 2 is an isometric view of a grasping assembly of FIG. 1.
Figure 3:
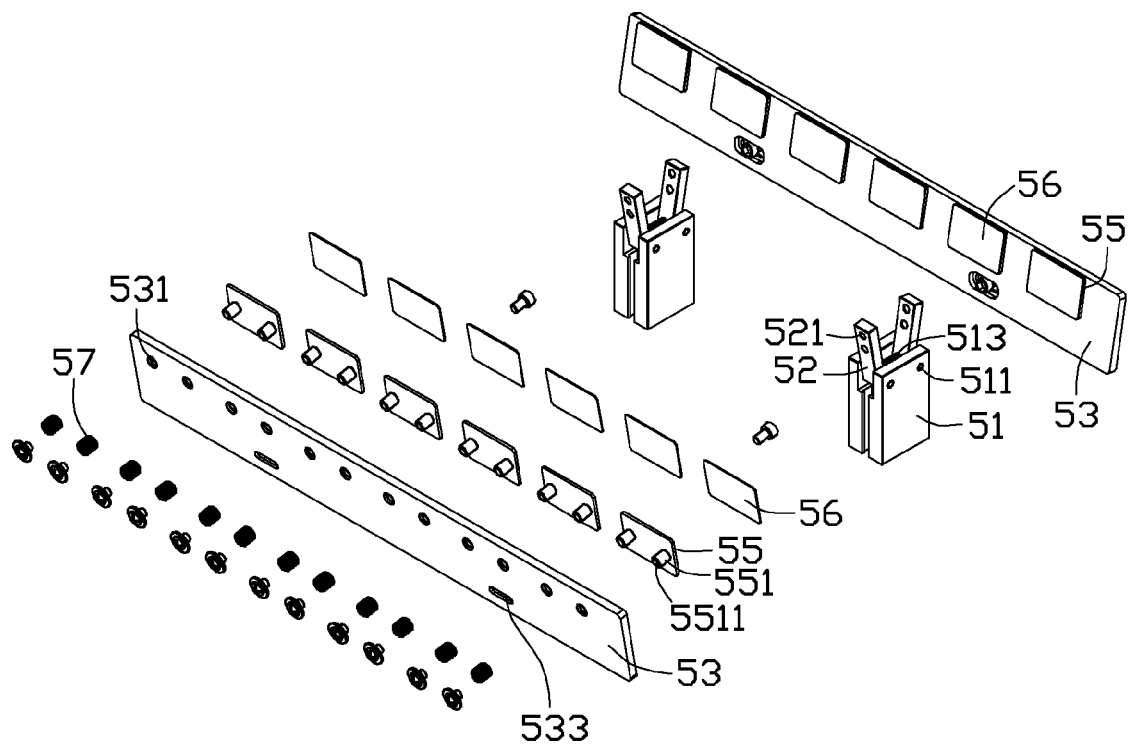
FIG. 3 is an exploded, isometric view of the grasping assembly of FIG. 2.

Referring to FIG. 2 and FIG. 3, each of the plurality of grasping assemblies 50 includes two cylinders 51 and two grasping plates 53, a plurality of grasping blocks 55, and a plurality of first resilient members 57.

Each cylinder 51 is adapted to rotate two rotating arms 52. Each rotating arm 52 is secured to the cylinder 51 by a shaft 511 and can be rotated about the shaft 511 relative to the cylinder 51. Each rotating arm 52 defines a mounting hole 521. A second resilient member 513 is secured between the two rotating arms 52. When the second resilient member 513 is in a free state, a first angle is defined between the two rotating arms 52. In one embodiment, the second resilient member 513 is a compression spring, and the first angle is acute.

Each grasping plate 53 defines a plurality of through holes 531 and two securing holes 533. Two mounting posts 551 protrude from each grasping block 55 and can be inserted into adjacent two of the plurality of through holes 531. Each mounting post 551 defines a locking hole 5511. In one embodiment, the two mounting posts 551 are substantially perpendicular to the grasping block 55. The first resilient member 57 can be secured to the mounting post 551. In one embodiment, the first resilient member 57 is a compression spring.

Figure 4:
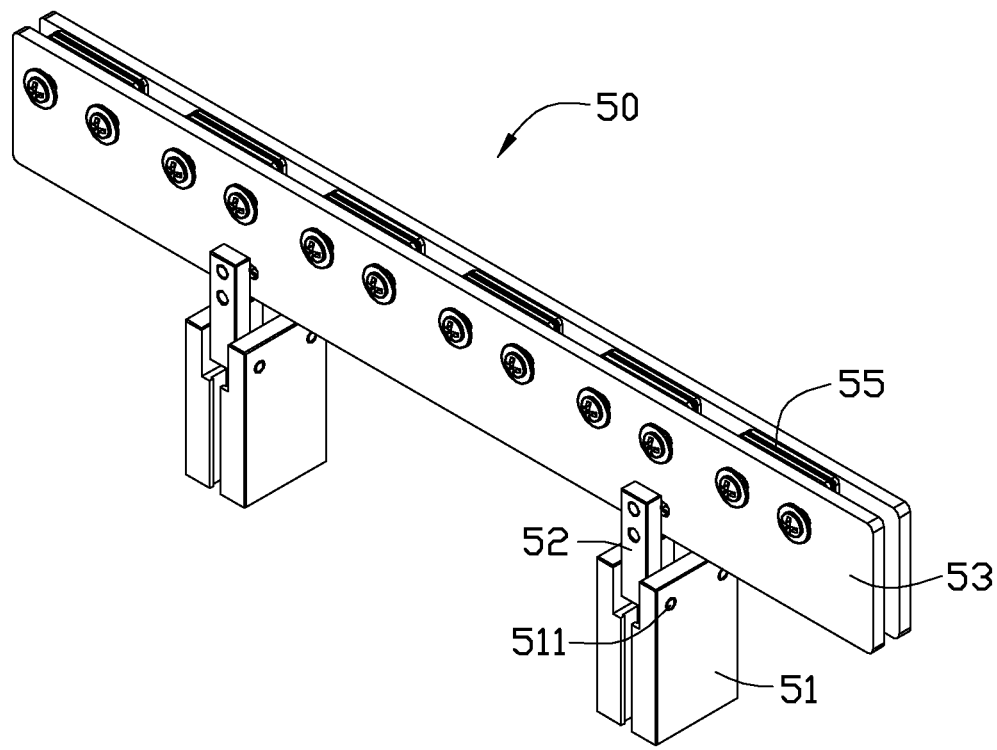
FIG. 4 is similar to FIG. 2, but shows the grasping assembly in another position.
Figure 5:
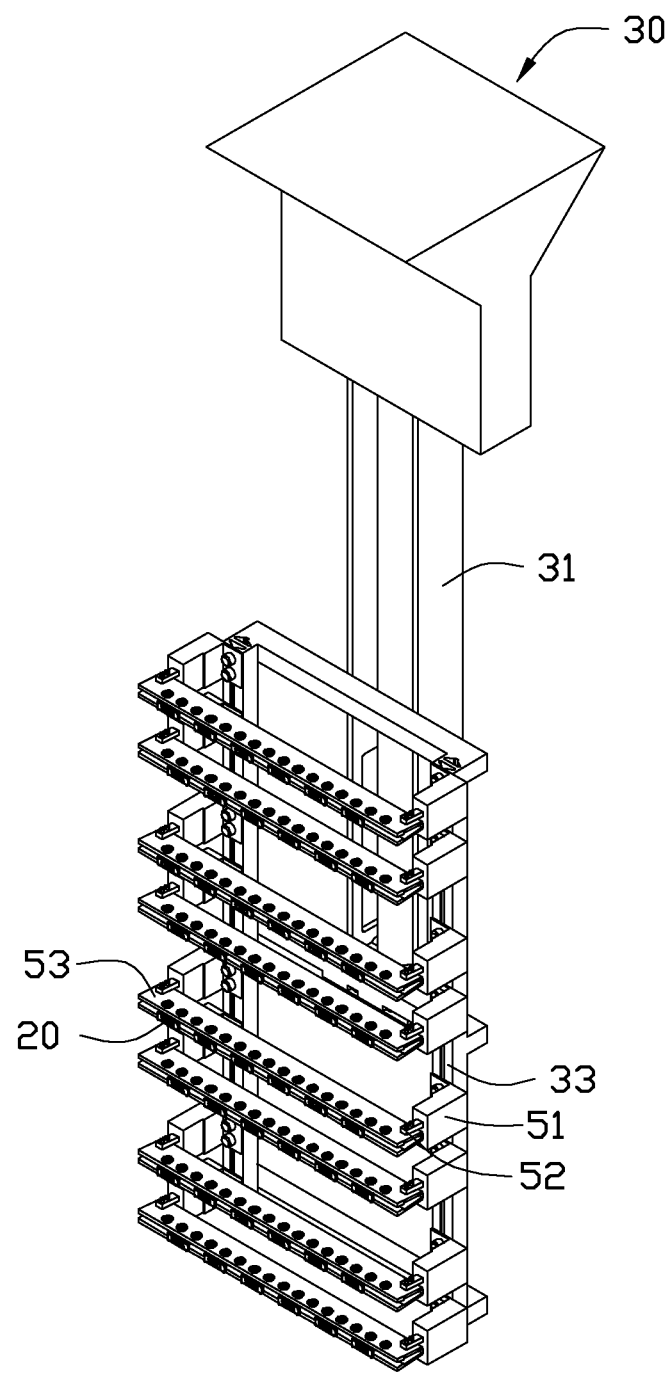
FIG. 5 is an isometric view of an assembled grasping apparatus and the manufacturing device, but with a mold omitted.

Referring to FIG. 4 and FIG. 5, in assembly, a locking member (not shown), such as a screw, is inserted into the mounting hole 521 and the securing hole 533, to secure the grasping plate 53 to the rotating arm 52. The grasping plate 53 is secured between the two rotating arms 52 and is rotatable together with the two rotating arms 52 relative to the cylinder 51. The first resilient member 57 is positioned to surround to the mounting post 551. The grasping block 55 is moved towards the grasping plate 53, and the mounting post 551 is aligned with the through hole 531. The grasping block 55 is further moved to engage the mounting post 551 in the through hole 531. The first resilient member 57 abuts the grasping plate 53 and the grasping block 55 and is compressed. Another locking member (not shown), such as a screw, is inserted into the through hole 531 and the locking hole 5511, and then the grasping block 55 is secured to the grasping plate 53. The cylinder 51 is secured to the rotating bracket 33. Thus, the grasping assembly 50 is secured to the robot 30.

In use, the robot 30 receives a signal to grasp the plurality of products 20 and moves towards the manufacturing device 10 with the grasping assembly 50, until the grasping plate 53 abuts against the manufacturing device 10. In this position, a row of the plurality of products 20 is located between the two grasping plates 53, and each of plurality of products 20 is located between opposite two grasping blocks 55. The cylinder 51 drives the two rotating arms 52 to rotate towards each other about the shaft 511. The second resilient member 513 is elastically deformed. The two rotating arms 52 drive the two grasping plates 53 to rotate towards each other, until each opposite two grasping blocks 55 abuts against one of the plurality of products 20. The plurality of products 20 presses and slides the grasping block 55 towards the corresponding grasping plate 53. The first resilient member 57 is elastically deformed and exerts elastic force to sandwich the plurality of products 20. The plurality of products 20 is prevented from separating from the grasping blocks 55. If distances between each opposite two grasping blocks 55 are different, the corresponding first resilient member 57 exerts different elastic force to ensure each of plurality of products 20 is sandwiched between the opposite two grasping blocks 55.

When the plurality of products 20 is removed from the manufacturing device 10, the second resilient member 513 rebounds to move the two rotating arms 52 and the two grasping plates 53 away from each other. Thus, the plurality of products 20 is separated from the grasping assembly 50 and received in a receiving device (not shown).

In other embodiments, the grasping assembly 50 further includes a plurality of vibration-dampening washers 56. Sizes of the washers 56 are substantially equal to that of each grasping block 55. One washer 56 is attached to each grasping block 55, and each grasping block 55 is secured between the corresponding washer 56 and the grasping plate 53. In use, a product is sandwiched between opposite two washers 56. The washers 56 are elastically deformed and further prevent the product 20 from separating from the grasping assembly 50.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. A grasping apparatus comprising:
a robot; and
a grasping assembly mounted to the robot, and the grasping assembly being rotatable relative to the robot and comprising:
a cylinder secured to the robot;
two grasping plates rotatably attached to the cylinder, and the cylinder being capable of driving the two grasping plates to rotate towards each other;
two grasping blocks, and each of the two grasping blocks slidably attached to one of the two grasping plates; and
two first resilient members, and each of the two first resilient members are located between each of the two grasping blocks and each of the two grasping plates; and when the two grasping plates are rotated towards each other, the two grasping blocks are adapted to sandwich a product from a manufacturing device therebetween;
wherein a mounting post protrudes from each of the two grasping blocks, each of the two grasping plates defines a through hole, and the mounting post is slidably received in the through hole; and the two grasping blocks are slidable relative to the two grasping plates along the through hole.

2. The grasping apparatus of claim 1, wherein the grasping assembly further comprises two washers, each of the two washers is secured to each of the two grasping blocks, and the two washers are adapted to grasp the product therebetween.

3. The grasping apparatus of claim 2, wherein a size of the two washers is substantially equal to that of the two grasping blocks, and each of the two grasping blocks is located between each of two grasping plates and each of the two washers.

4. The grasping apparatus of claim 2, wherein the two washers are elastically deformable.

5. The grasping apparatus of claim 1, wherein the mounting post defines a locking hole, the locking hole is aligned with the through, and the locking hole and the through hole are adapted for a locking member inserting through and prevent the two grasping blocks from separating from the two grasping plates.

6. The grasping apparatus of claim 1, wherein each of the two first resilient members surrounds the mounting post and abuts against each of two grasping plates and each of the two grasping blocks.

7. The grasping apparatus of claim 1, wherein the mounting post is substantially perpendicular to the two grasping blocks.

8. The grasping apparatus of claim 1, wherein two rotating arms rotatably attached to the cylinder, each of the two grasping plates is secured to each of the two rotating arms, and the cylinder drives the two grasping plates to rotate by the two rotating arms.

9. The grasping apparatus of claim 8, wherein a second resilient member is secured between the two rotating arms.

10. A grasping apparatus comprising:
a cylinder;
two rotating arms rotatably attached to the cylinder;
two grasping plates rotatably attached to the cylinder, and each of the two grasping plates secured to one of the two rotating arms; and the cylinder being capable of driving the two rotating arms with the two grasping plates to rotate towards each other;
two grasping blocks, and each of the two grasping blocks slidably attached to one of the two grasping plates;
two washers, each of the two washers is secured to each of the two grasping blocks; and
two first resilient members, and each of the two first resilient members secured between each of the two grasping blocks and each of the two grasping plates; when the two grasping plates are rotated towards each other, the two washers are adapted to sandwich a product from a manufacturing device therebetween;
wherein a mounting post protrudes from each of the two grasping blocks, each of the two grasping plates defines a through hole, and the mounting post is slidably received in the through hole; and the two grasping blocks are slidable relative to the two grasping plates along the through hole.

11. The grasping apparatus of claim 10, wherein a size of the two washers is substantially equal to that of the two grasping blocks, and each of the two grasping blocks is located between each of the two grasping plates and each of the two washers.

12. The grasping apparatus of claim 10, wherein the two washers are elastically deformable.

13. The grasping apparatus of claim 10, wherein the mounting post defines a locking hole, the locking hole is aligned with the through, and the locking hole and the through hole are adapted for a locking member inserting through and prevent the two grasping blocks from separating from the two grasping plates.

14. The grasping apparatus of claim 10, wherein each of the two first resilient members surrounds the mounting post and abuts against the corresponding grasping plate and the corresponding grasping block.

15. The grasping apparatus of claim 10, wherein the mounting post is substantially perpendicular to the two grasping blocks.

16. The grasping apparatus of claim 10, wherein a second resilient member is secured between the two rotating arms.

17. A grasping apparatus comprising:
a robot; and
a grasping assembly mounted to the robot, and the grasping assembly being rotatable relative to the robot and comprising:
a cylinder secured to the robot;
two grasping plates rotatably attached to the cylinder, and the cylinder being capable of driving the two grasping plates to rotate towards each other;
two grasping blocks, and each of the two grasping blocks slidably attached to one of the two grasping plates; and
two first resilient members, and each of the two first resilient members are located between each of the two grasping blocks and each of the two grasping plates; and when the two grasping plates are rotated towards each other, the two grasping blocks are adapted to sandwich a product from a manufacturing device therebetween;
wherein a mounting post protrudes from each of the two grasping blocks, each of the two grasping plates defines a through hole, and the mounting post is received in the through hole; and the two grasping blocks are slidable relative to the two grasping plates along the through hole; wherein each of the two first resilient members surrounds the mounting post and abuts against each of two grasping plates and each of the two grasping blocks.

* * * * *